US009883345B2

(12) United States Patent
Goldfarb

(10) Patent No.: US 9,883,345 B2
(45) Date of Patent: *Jan. 30, 2018

(54) SYSTEM AND METHOD FOR GEOGRAPHY-BASED CORRELATION OF CELLULAR AND WLAN IDENTIFIERS

(71) Applicant: Verint Systems Ltd., Herzelia, Pituach (IL)

(72) Inventor: Eithan Goldfarb, Ness Ziona (IL)

(73) Assignee: VERINT SYSTEMS LTD., Herzelia, Pituach (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/398,182

(22) Filed: Jan. 4, 2017

(65) Prior Publication Data
US 2017/0180940 A1    Jun. 22, 2017

Related U.S. Application Data

(63) Continuation of application No. 14/924,882, filed on Oct. 28, 2015, now Pat. No. 9,578,462, which is a
(Continued)

(30) Foreign Application Priority Data
Jan. 29, 2013    (IL) .......................................... 224483

(51) Int. Cl.
*H04W 24/00*    (2009.01)
*H04W 4/02*    (2009.01)
(Continued)

(52) U.S. Cl.
CPC .......... *H04W 4/026* (2013.01); *H04W 84/042* (2013.01); *H04W 84/12* (2013.01); *H04W 88/06* (2013.01)

(58) Field of Classification Search
CPC ..... H04W 64/00; H04W 88/06; H04W 84/12; H04M 1/72519
(Continued)

(56) References Cited

U.S. PATENT DOCUMENTS 7,941,140 B2    5/2011    Grayson et al.
8,462,745 B2 *  6/2013    Alizadeh-Shabdiz
                          .............................. G01S 5/0263
                          370/338
(Continued)

FOREIGN PATENT DOCUMENTS

WO    2010/116292    10/2010

OTHER PUBLICATIONS

GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
(Continued)

*Primary Examiner* — Danh Le
(74) *Attorney, Agent, or Firm* — Meunier Carlin & Curfman

(57) ABSTRACT

Methods and systems for tracking mobile communication terminals based on their identifiers. The disclosed techniques identify cellular terminals and Wireless Local Area Network (WLAN) terminals that are likely to be carried by the same individual, or cellular and WLAN identifiers that belong to the same multi-mode terminal. A correlation system is connected to a cellular network and to a WLAN. The system receives location coordinates of cellular identifiers used by mobile terminals in the cellular network, and location coordinates of WLAN identifiers used by mobile terminals in the WLAN. Based on the location coordinates, the system is able to construct routes that are traversed by the terminals having the various cellular and WLAN iden-
(Continued)

tifiers. The system attempts to find correlations in time and space between the routes.

20 Claims, 2 Drawing Sheets

Related U.S. Application Data continuation of application No. 14/167,062, filed on Jan. 29, 2014, now Pat. No. 9,185,519.

(51) Int. Cl.
*H04W 84/12* (2009.01)
*H04W 84/04* (2009.01)
*H04W 88/06* (2009.01)

(58) Field of Classification Search
USPC ...... 455/456.1, 552.1, 550.1, 456.6; 370/338
See application file for complete search history.

(56) References Cited

U.S. PATENT DOCUMENTS

| | | | |
|---|---|---|---|
| 8,467,809 | B2 | 6/2013 | Lee et al. |
| 9,001,743 | B2* | 4/2015 | Alizadeh-Shabdiz ............................. G01S 5/0263 370/328 |
| 2002/0077103 | A1 | 6/2002 | Bonta |
| 2004/0023669 | A1* | 2/2004 | Reddy ............... H04W 36/32 455/456.1 |
| 2007/0297383 | A1* | 12/2007 | Buckley ............ H04W 48/16 370/338 |
| 2008/0102826 | A1* | 5/2008 | Voyer ................ H04W 68/02 455/432.1 |
| 2009/0016524 | A1 | 1/2009 | Park et al. |
| 2009/0161639 | A1* | 6/2009 | Ostergren ......... H04W 48/16 370/338 |
| 2009/0245206 | A1 | 10/2009 | Liu |
| 2009/0324025 | A1* | 12/2009 | Camp, Jr. ......... G07C 9/00007 382/124 |
| 2010/0066531 | A1 | 3/2010 | Karr |
| 2011/0294515 | A1* | 12/2011 | Chen .................. G01S 5/0252 455/456.1 |
| 2012/0158293 | A1 | 6/2012 | Burnham |
| 2012/0200430 | A1 | 8/2012 | Spahl |
| 2012/0220224 | A1 | 8/2012 | Walker |
| 2012/0315839 | A1* | 12/2012 | Mumcuoglu ......... H04W 4/02 455/2.01 |
| 2014/0004892 | A1 | 1/2014 | Murynets et al. |
| 2014/0019873 | A1 | 1/2014 | Gupta et al. |
| 2014/0100781 | A1* | 4/2014 | Venkatraman ......... G01C 21/20 701/537 |
| 2015/0081474 | A1 | 3/2015 | Kostka et al. |
| 2015/0131462 | A1* | 5/2015 | Puranik ............. H04W 52/0212 370/252 |
| 2016/0119862 | A1* | 4/2016 | Rinne ................. H04W 36/14 455/434 |

OTHER PUBLICATIONS

Asokan, N., et al., "Man-in-the-Middle in Tunneled Authentication Protocols," Draft version 1.3 (latest public version: http://eprint.iacr.org/2002/163/, 2002, 15 pages.

Vedaldi, A., "An implementation of SIFT detector and descriptor," University of California at Los Angeles, 2007, 7 pages.

Girardin, F., et al., "Detecting air travel to survey passengers on a worldwide scale," Journal of Location Based Services, 2010, 26 pages.

Meyer, U., et al., "On the Impact of GSM Encryption and Man-in-the-Middle Attacks on the Security of Interoperating GSM/UMTS Networks," IEEE, 2004, 8 pages.

\* cited by examiner

SYSTEM AND METHOD FOR GEOGRAPHY-BASED CORRELATION OF CELLULAR AND WLAN IDENTIFIERS

CROSS-REFERENCE TO RELATED APPLICATIONS

This application is a continuation of U.S. patent application Ser. No. 14/924,882, filed on Oct. 28, 2015, which is a continuation of U.S. patent application Ser. No. 14/167,062, filed on Jan. 29, 2014 and now U.S. Pat. No. 9,185,519, the entire contents of each of which are incorporated herein by reference. This application also claims foreign priority to Israeli application number IL 224483 filed on Jan. 29, 2013.

FIELD OF THE DISCLOSURE

The present disclosure relates generally to wireless communication, and particularly to methods and systems for correlating cellular and Wireless Local Area Network (WLAN) terminals.

BACKGROUND OF THE DISCLOSURE

Various techniques for tracking and locating mobile communication terminals, such as cellular phones, are known in the art. For example, U.S. Patent Application Publication 2012/0015626, whose disclosure is incorporated herein by reference, describes Methods and systems for determining mobile communication terminals (mobiles) that have a common user, or that have a group of users in common. The methods and systems examine change-of-association events of mobiles operating in a network, and correlate the events to determine common mobiles, i.e., mobiles that have the same or similar change-of-association events. The events described are generated by the mobiles themselves automatically, by virtue of the fact that the mobiles are operating in the network. There is thus no need for, and the embodiments described herein do not require, user intervention to generate the events.

SUMMARY OF THE DISCLOSURE

An embodiment that is described herein provides a method including receiving first location coordinates measured for a first identifier used for identification in a cellular communication network, and receiving second location coordinates measured for one or more second identifiers used for identification in a Wireless Local Area Network (WLAN). A second identifier, whose second location coordinates traverse a second geographical route, at least part of which is correlative in time and space with a corresponding part of a first geographical route traversed by the first location coordinates, is found among the second identifiers. A correlation between the first identifier in the cellular communication network and the second identifier in the WLAN is acted upon.

In some embodiments, the first identifier used in the cellular communication network is associated with a target individual, and acting upon the correlation includes tracking the target individual by tracking the second identifier in the WLAN. In an embodiment, finding the second identifier includes discarding a given second identifier upon detecting that, in a given time interval, a location of the given second identifier differs from the location of the first identifier by more than a predefined distance.

In some embodiments, finding the second identifier includes defining a group of candidate second identifiers that are located in a vicinity of the first identifier at a given time, and selecting the second identifier from among the candidate second identifiers. Selecting the second identifier may include removing from the group the candidate one or more second identifiers that are not located in the vicinity of the first identifier at one or more second times.

In an embodiment, the first identifier includes at least one identifier type selected from a group of types consisting of an International Mobile Subscriber Identity (IMSI), a Mobile Station International Subscriber Directory Number (MSISDN), an International Mobile Equipment Identity (IMEI) and a Temporary Mobile Subscriber Identity (TMSI). In another embodiment, the second identifier includes at least one identifier type selected from a group of types consisting of an Internet Protocol (IP) address and a Medium Access Control (MAC) address.

In yet another embodiment, receiving the second location coordinates includes receiving from the WLAN indications of one or more probe request messages of WLAN terminals that are not connected to the WLAN. In still another embodiment, finding the second identifier includes identifying that a single multi-mode communication terminal uses the first and second identifiers. In an embodiment, finding the second identifier includes identifying that a first communication terminal that uses the first identifier and a second communication terminal that uses the second identifier are both carried by a single individual.

There is additionally provided, in accordance with an embodiment that is described herein, apparatus including a first interface, a second interface and a processor. The first interface is configured to receive first location coordinates measured for a first identifier used for identification in a cellular communication network. The second interface is configured to receive second location coordinates measured for one or more second identifiers used for identification in a Wireless Local Area Network (WLAN). The processor is configured to find among the second identifiers a second identifier whose second location coordinates traverse a second geographical route, at least part of which is correlative in time and space with a corresponding part of a first geographical route traversed by the first location coordinates, and to establish a correlation between the first identifier in the cellular communication network and the second identifier in the WLAN.

The present disclosure will be more fully understood from the following detailed description of the embodiments thereof, taken together with the drawings in which:

DETAILED DESCRIPTION OF EMBODIMENTS

Overview

Figure 1:
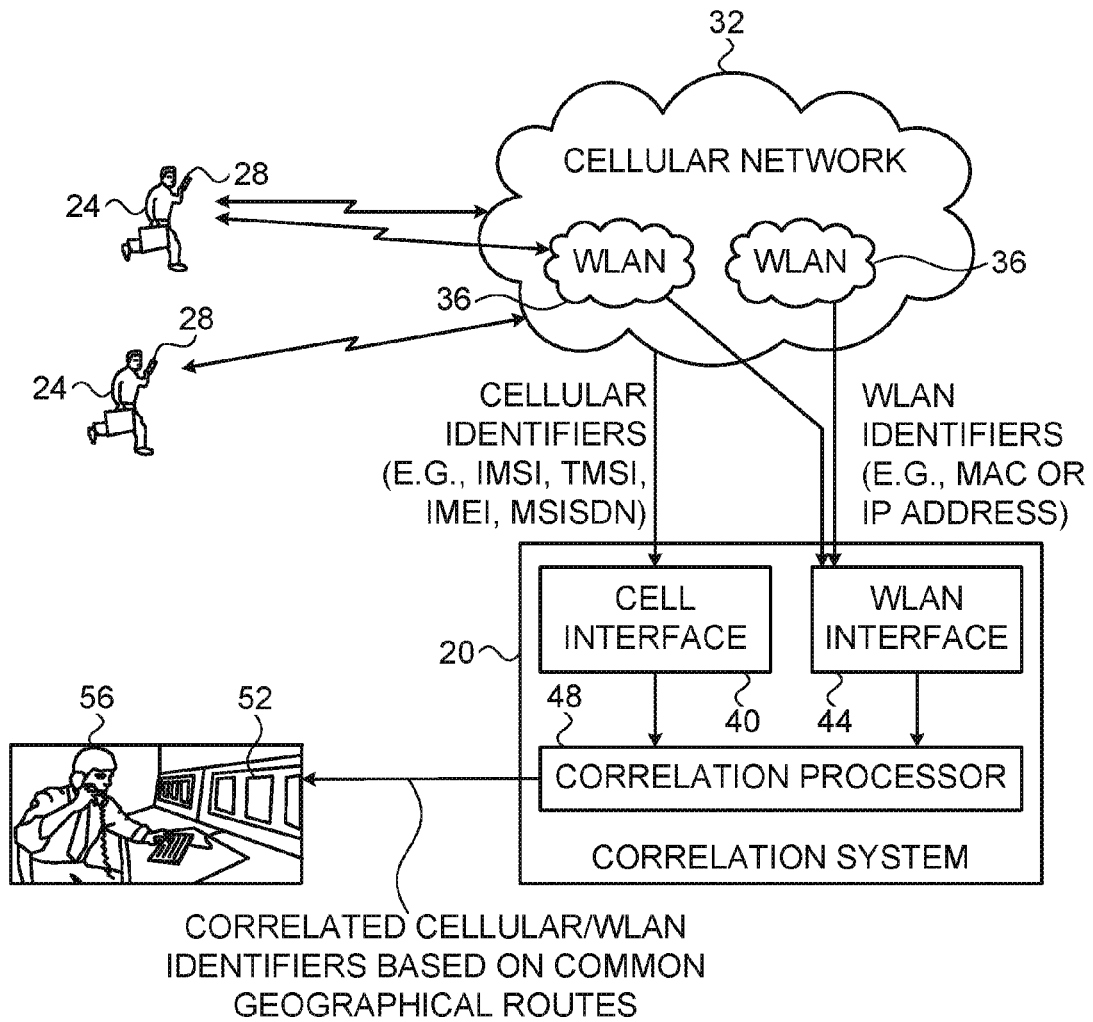
FIG. 1 is a block diagram that schematically illustrates a system for correlating cellular and WLAN communication terminals, in accordance with an embodiment that is described herein.

Tracking of mobile communication terminals, such as cellular phones, is an important surveillance tool in many anti-terrorist and crime prevention applications. In many cases, however, it is difficult to correlate communication terminals with the individuals who carry them. For example, hostile users often take measures to prevent tracking of their mobile communication terminals.

Embodiments that are described herein provide improved methods and systems for tracking mobile communication terminals based on their identifiers. The disclosed techniques identify cellular terminals and Wireless Local Area Network (WLAN) terminals that are likely to be carried by the same individual, or cellular and WLAN identifiers that belong to the same multi-mode terminal.

In some embodiments, a correlation system is connected to a cellular network and to a WLAN. The system receives location coordinates of cellular identifiers used by mobile terminals in the cellular network, and location coordinates of WLAN identifiers used by mobile terminals in the WLAN. Cellular identifiers may comprise, for example, International Mobile Subscriber Identities (IMSI), Mobile Station International Subscriber Directory Numbers (MSISDN), International Mobile Equipment Identities (IMEI) or Temporary Mobile Subscriber Identities (TMSI). WLAN identifiers may comprise, for example, Internet Protocol (IP) or Medium Access Control (MAC) addresses.

Based on the location coordinates, the system is able to construct routes that are traversed by the terminals having the various cellular and WLAN identifiers. The system attempts to find correlations in time and space between the routes. If a geographical correlation of this sort is found between a cellular identifier and a WLAN identifier, the system concludes that the two identifiers are likely to belong to the same communication terminal, or to separate terminals carried by the same user.

The collection of location coordinates of cellular and WLAN identifiers is typically performed in mass, whereas the correlation between the identifiers is typically performed in a target-centric manner. In a typical flow, the system is provided with a cellular identifier of a target individual, and attempts to find a WLAN identifier whose route is correlative in time and space with the route traversed by the cellular identifier. (In the present context, the phrase "a route traversed by an identifier" refers to a route traversed by a terminal having the identifier, for the sake of brevity. Similarly, the term "the location of an identifier" refers to the location of a terminal having the identifier.)

In an example embodiment, the system searches for a matching WLAN identifier by progressively discarding candidate WLAN identifiers whose correlation with the cellular identifier is insufficient. For example, the system may begin the search with a group of initial candidate WLAN identifiers that are found in the vicinity of the cellular identifier at a certain time. The system then moves to a subsequent point along the cellular identifier's route, and retains only candidate WLAN identifiers that are located in the vicinity of the cellular identifier at the subsequent time, as well. The system continues to narrow down the list of candidate WLAN identifiers in this manner, until converging to a single candidate WLAN identifier that is sufficiently correlative in time and space with the cellular identifier.

In some embodiments, the correlation process takes into account the fact that WLAN coverage is often far from continuous and has many uncovered regions ("holes"). Moreover, WLAN operation may be turned off for certain periods of time. Therefore, a candidate WLAN identifier that correlates with a cellular identifier over parts of the route but is missing from other parts of the route may well be the sought identifier.

Thus, it is typically sufficient to show correlation between a candidate WLAN identifier and a cellular identifier along parts of the route, provided that along the other parts of the route there are no WLAN location events of the candidate WLAN identifiers. Preferably, there should be no other WLAN location events of any terminals in these areas.

Because of the sporadic nature of WLAN coverage and activity, negative correlations play a central role in the disclosed correlation processes. A negative correlation event occurs when a cellular identifier and a WLAN identifier are found at distant locations within a short time interval, such that travelling between the locations within this time interval is not feasible. Such a situation, even if detected only once, disqualifies any possible correlation between the two identifiers.

The correlations between cellular and WLAN identifiers are valuable for subsequent tracking and information gathering tasks. Typically, WLAN identifiers are transmitted over the air much more frequently than cellular identifiers, and also provide higher spatial accuracy. As such, tracking of WLAN identifiers is potentially highly accurate. On the other hand, the association of WLAN identifiers with target users is often unknown. Correlations between cellular identifiers can sometimes be obtained from the cellular service providers, but they usually do not have information regarding WLAN identifiers. By correlating a target user with a WLAN identifier through a known cellular identifier, it is possible to track the target user using his or her WLAN identifier.

System Description

FIG. 1 is a block diagram that schematically illustrates a system 20 for correlating cellular and WLAN communication terminals, in accordance with an embodiment that is described herein. System 20 may be used, for example, by various government and law enforcement agencies in order to track individuals 24, such as criminals or terrorists, by tracking mobile communication terminals 28 they carry.

Terminals 28 communicate with one or more cellular communication networks 32, such as GSM or UMTS networks, and/or with one or more Wireless Local Area Networks (WLANs) 36. Although the example of FIG. 1 shows a single cellular network and two WLANs, the disclosed techniques can be used with any desired number of cellular networks and WLANs.

Some of terminals 28 may communicate with only one type of network, whereas other terminals comprise multi-mode terminals that communicate over both the cellular network and the WLAN. Terminals 28 may comprise, for example, cellular phones, wireless-enabled personal computing devices, or any other suitable type of communication terminal.

Any terminal 28 that communicates with cellular network 32 is identifies in network 32 using one or more cellular identifiers. Any terminal 28 that communicates with WLAN 36 is identifies in network 36 using one or more WLAN identifiers. Several examples of cellular and WLAN identifiers are given below. Generally, the cellular and WLAN identifiers may comprise any suitable identifiers that are used for identifying terminals 28 in the respective networks.

In the example of FIG. 1, system 20 comprises a cellular interface 40 for connecting to cellular network 32, a WLAN interface 44 for connecting to WLAN 36, and a correlation processor 48 that carries out the methods described herein. Processor 48 receives via interface 40 location coordinates measured for various cellular identifiers, and receives via interface 44 location coordinates measured for various WLAN identifiers.

Note that the connection between the terminal and the network typically differs between cellular systems and WLANs. In a cellular system, the terminal is typically connected to one of the available networks at any given time. A WLAN terminal, on the other hand, is very frequently not connected to any WLAN. Nevertheless, even when not connected, the WLAN terminal transmits 'probe request' messages periodically, searching for one of the WLAN access points it was previously connected to. The probe requests can be used for detecting the WLAN terminal's location. The frequency of location events also differs between cellular systems and WLANs: In a WLAN, location events typically occur less than a minute apart. In a cellular network, on the other hand, location events may occur infrequently, e.g., at more than ten minute intervals or more. Additional details regarding probe requests can be found in the IEEE 802.11 WLAN specifications.

Based on the location coordinates of the cellular and WLAN identifiers, processor 48 finds cellular and WLAN identifiers having correlative geographical routes. Processor 48 outputs the correlations between cellular and WLAN identifiers to a monitoring center 52, for display to an operator 56. Example methods for establishing such correlations are described further below. Certain additional aspects of correlating cellular and WLAN identifiers are addressed, for example, in Israel Patent Application 217867, filed Jan. 31, 2012, which is assigned to the assignee of the present patent application and whose disclosure is incorporated herein by reference.

The configuration of system 20 shown in FIG. 1 is an example configuration, which is chosen purely for the sake of conceptual clarity. In alternative embodiments, any other suitable system configuration can be used. For example, the functions of correlation processor 48 may be partitioned among any desired number of processors, e.g., servers or other computing platforms, or performed by a single processor. The functions of correlation processor 48 may be implemented in software, in hardware, or using a combination of hardware and software elements.

In some embodiments, processor 48 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Geography-Based Correlation Between Cellular and WLAN Identifiers

The disclosed techniques are based on an underlying assumption that a cellular identifier and a WLAN identifier found in the same vicinity during the same time interval are likely to be associated with the same individual. The geographical vicinity usually takes into account the limited accuracy of the location measurements. This accuracy is typically on the order of several hundred meters for a cellular identifier and less than fifty meters for a WLAN identifiers, although any other suitable accuracy can also be used. The time interval typically takes into account the different occurrence frequencies of location events in the cellular network and in the WLAN, as explained above.

This time-space correlation, however, is susceptible to false correlations, especially in dense environments that contain large numbers of terminals. One way of increasing the confidence of the correlation is to repeat it over geographical routes traversed by the identifiers rather than at a single point in space and time.

Negative correlation, on the other hand, can often be established using a single event: A cellular identifier and a WLAN identifier found at different locations (e.g., locations that differ by more than a predefined distance) within a given time interval cannot be associated with the same terminal, and are unlikely to be associated with the same individual.

Thus, in some embodiments, processor 48 of system 20 correlates cellular identifiers with WLAN identifiers by finding similarities between the geographical routes traversed by the terminals having the identifiers. The disclosed techniques are thus particularly suitable for scenarios in which WLAN 36 covers a large geographical area, which has a considerable overlap with the coverage area of cellular network 32. For example, WLAN 36 may comprise a public WLAN or a dedicated WLAN that is deployed for serving system 20. Nevertheless, the disclosed techniques can be used in any other suitable deployment scenario of networks 32 and 36.

Figure 2:
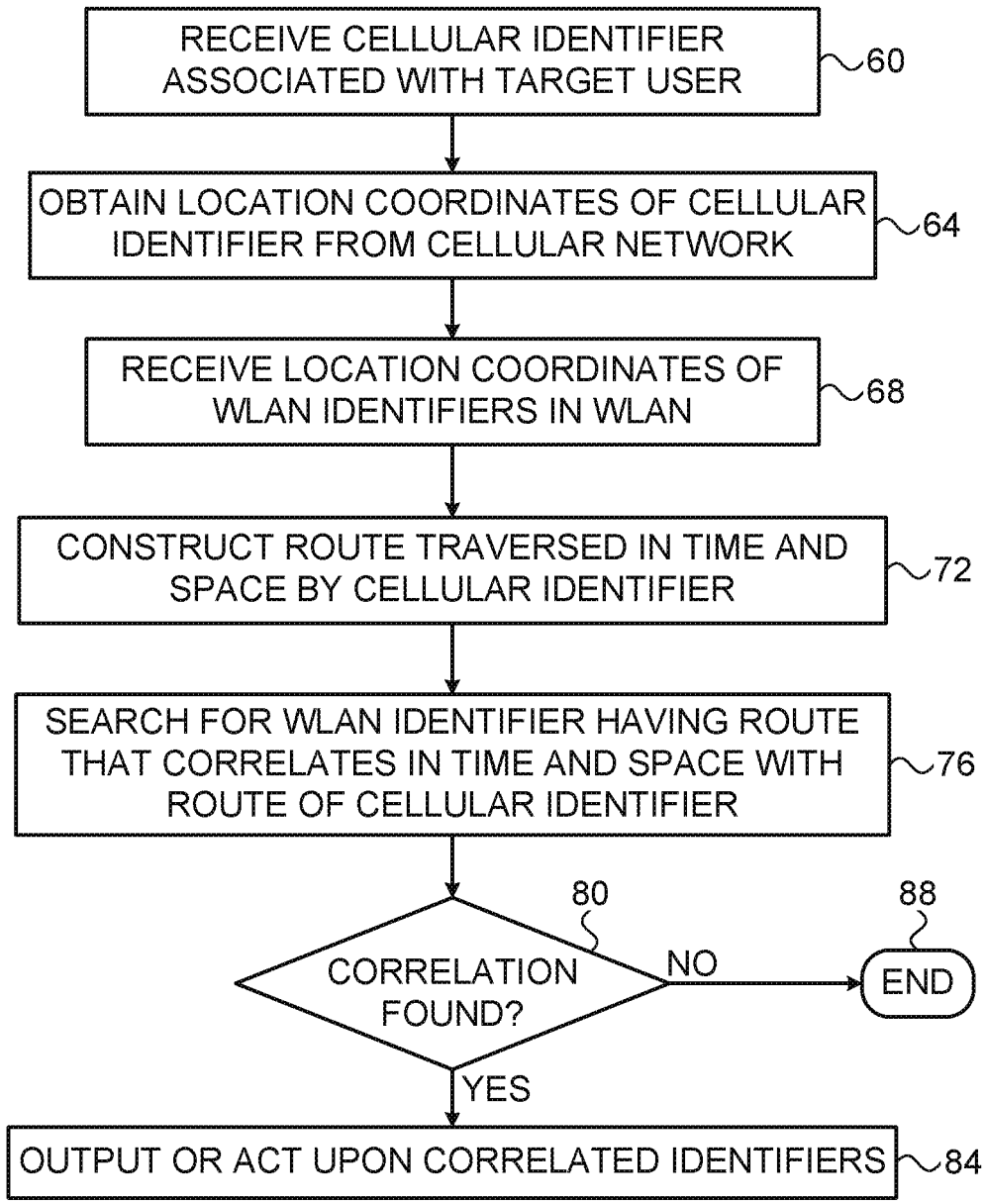
FIG. 2 is a flow chart that schematically illustrates a method for correlating cellular and WLAN communication terminals, in accordance with an embodiment that is described herein.

FIG. 2 is a flow chart that schematically illustrates a method for correlating cellular and WLAN communication terminals, carried out by system 20, in accordance with an embodiment that is described herein. The method begins with correlation processor 48 receiving from monitoring center 52 a cellular identifier that is associated with a target individual, at a cellular identifier input step 60. The cellular identifier may comprise, for example, an IMSI, TMSI, MSISDN or IMEI of a cellular terminal belonging to the target individual.

Processor 48 obtains location coordinates of this cellular identifier, at a cellular coordinate input step 64. Typically, processor 48 obtains the location coordinates of the cellular identifier from cellular network 32 via interface 40. The interface may receive information from network 32 in various ways, such as by connecting to one or more of the wire-line interfaces between switching nodes of network 32, or using off-the-air reception. The location coordinates are typically generated as a result of location events that occur in the cellular network in response to various conditions, such as hand-off or change of Location Area Code (LAC). Typically, each location coordinate is received together with a time stamp indicating the time at which the location was measured.

Processor 48 obtains location coordinates of various WLAN identifiers, at a WLAN coordinate input step 68. As noted above, WLAN location events can also be received from WLAN terminals that are not connected to WLAN 36, but are located in the vicinity of access points that belong to this WLAN. Periodic 'probe requests' of such terminals may be received by WLAN 36 and obtained by processor 48.

The WLAN identifiers may comprise, for example, IP or MAC addresses. In addition to the WLAN identifier, each location coordinate is typically received together with a time stamp indicating the time at which the location was measured. Typically, processor 48 obtains the location coordinates of the WLAN identifiers from WLAN 36 via interface 44.

Interface 44 may receive information from WLAN 36 using any suitable wire-line or off-the-air connection. In some embodiments, interface 44 comprises a self-contained system that locates WLAN terminals. Example systems of this sort are produced by AeroScout, Inc. (Redwood City, Calif.) and by Ekahau, Inc. (Reston, Va.). Certain aspects of extracting identifiers from WLAN communication devices are addressed, for example, in U.S. Patent Application Publication 2011/0128127, whose disclosure is incorporated herein by reference.

Having acquired the location coordinates of the various WLAN identifiers, processor 48 begins a process of identifying a WLAN identifier that is likely to be associated with the same target user as the cellular identifier received at step 60 above. This WLAN identifier may belong to the same multi-mode terminal as the cellular terminal, or to a separate WLAN terminal carried by the same user.

At a cellular route construction step 72, processor 48 uses the location coordinates and time stamps received at step 64 to construct the route traversed by the cellular terminal of the target individual. The route is defined in both time and space, i.e., specifies the time at which each location coordinate was traversed.

At a WLAN identifier searching step 76, Processor 48 searches for a WLAN identifier whose route is correlative (in time and space) with the route of the cellular identifier. In other words, processor 48 searches for a WLAN identifier that traversed similar location coordinates as the cellular identifier at similar times. Such a WLAN has a very high likelihood of being associated with the same target individual.

As explained above, the WLAN coverage may be sporadic and discontinuous, and the WLAN terminals are not always turned on. As such, gaps in the location coordinates of the WLAN identifier may well exist along its route. In the correlation process of step 76, such gaps do not disqualify a candidate WLAN identifier, and its correlation is established based on positive and negative correlations. Negative correlation is a particularly powerful means for disqualifying candidates. Both positive and negative correlations typically take into account the characteristic location accuracies and occurrence frequencies of location events in the cellular network and in the WLAN.

If a matching WLAN identifier is found, as checked at a checking step 80, processor 48 outputs or acts upon the identified correlation, at an output step 84. For example, processor 48 may indicate the correlated pair of cellular and WLAN identifiers to monitoring center 52. The monitoring center may act upon the correlation in various ways. For example, the monitoring center may begin tracking the target individual (e.g., track the location and/or network activity of the target individual) using the WLAN identifier. If no matching WLAN identifier is found, the method terminates at a termination step 88.

The flow of operations described in FIG. 2 is an example flow that is chosen purely for the sake of conceptual clarity. In alternative embodiments, any other suitable flow can be used.

In some embodiments, processor 48 searches for the matching WLAN identifier by testing an initial group of candidate WLAN identifiers, and gradually ruling-out candidate WLAN identifiers whose correlation with the cellular identifier is insufficient.

In an example embodiment, processor 48 begins the search of step 76 with a group of initial candidate WLAN identifiers that are found in the vicinity of the cellular identifier at a certain time. For each candidate WLAN identifier, processor 48 initially compares all of its location coordinates to those of the cellular identifier and attempts to establish negative correlation. If a negative correlation is found, the candidate WLAN identifier is immediately disqualified.

After this initial screening stage, processor 48 attempts to establish positive correlations between the cellular identifier and the remaining WLAN identifiers. Processor 48 may terminate the search process, for example, upon converging to a single remaining WLAN identifier, upon reaching a predefined confidence level (e.g., a predefined length of route that matches both types of identifiers), or when all the candidate WLAN identifiers are discarded.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for determining a WLAN identifier for a target terminal that communicates on both a cellular network and a wireless local area network (WLAN), the method comprising:

obtaining:
    a location of the target terminal in the cellular network from a cellular identifier for the target terminal, and locations of candidate terminals in the WLAN from WLAN identifiers for the candidate terminals;
comparing the location of the target terminal in the cellular network to the locations of the candidate terminals in the WLAN;
identifying, based on the comparison, candidate terminals in the vicinity of the target terminal at the same time;
repeating the obtaining, comparing, and identifying to determine the WLAN identifier of the target terminal.

2. The method according to claim 1, wherein the repeating the obtaining, comparing and identifying to determine the WLAN identifier of the target terminal comprises:
eliminating, after each repetition, candidate terminals that were not identified in previous repetitions until one candidate terminal remains; and
determining the WLAN identifier of the target terminal as the WLAN identifier for the one remaining candidate terminal.

3. The method according to claim 1, wherein the repeating the obtaining, comparing and identifying to determine the WLAN identifier of the target terminal comprises:
eliminating, after each repetition, candidate terminals that were not identified in previous repetitions until no candidate terminal remains; and
determining that the target terminal has no matching WLAN identifier.

4. The method according to claim 1, wherein the repeating the obtaining, comparing and identifying to determine the WLAN identifier of the target terminal comprises:
computing a confidence level for each candidate terminal, wherein each confidence level for a particular candidate terminal corresponds to the number of repetitions that each the particular candidate terminal is in the vicinity of the target terminal at the same time; and
determining the WLAN identifier of the target terminal as the WLAN identifier for a candidate terminal having a confidence level above a threshold.

5. The method according to claim 4, wherein the repeating is over a predefined length of a route.

6. The method according to claim 4, wherein the repeating is during a predefined time interval.

7. The method according to claim 1, further comprising:
receiving the cellular identifier for the target terminal from a monitoring center; and
communicating the WLAN identifier of the target terminal to the monitoring center.

8. The method according to claim 1, further comprising: tracking a target individual's location or network activity using the determined WLAN identifier.

9. The method according to claim 1, wherein the cellular identifier comprises an international mobile subscriber identity (IMSI), a temporary mobile subscriber identity (TMSI), an international mobile equipment identity (IMEI), or a mobile station international subscriber directory number (MSISDN) of a mobile phone.

10. The method according to claim 1, wherein the WLAN identifier comprises a medium accesses control (MAC) address or an internet protocol (IP) address of a mobile phone.

11. A system for obtaining a WLAN identifier for a target terminal that communicates on both a cellular network and a wireless local area network (WLAN), the system comprising
a cell interface connected to a cellular network and receiving cellular identifiers from terminals communicating on the cellular network;
a WLAN interface connected to one or more WLANs and receiving WLAN identifiers from terminals communicating on the one or more WLANs;
electronic memory storing software and data;
a correlation processor in communication with the cell interface, WLAN interface, and electronic memory, wherein upon execution, the software causes the processor to:
obtain a location of the target terminal in the cellular network from a cellular identifier for the target terminal, and locations of candidate terminals in the WLAN from WLAN identifiers for the candidate terminals;
compare the location of the target terminal in the cellular network to the locations of the candidate terminals in the WLAN;
identify, based on the comparison, candidate terminals in the vicinity of the target terminal at the same time;
repeat obtaining, comparing, and identifying to determine the WLAN identifier of the target terminal.

12. The system according to claim 11, wherein the operation to repeat obtaining, comparing, and identifying to determine the WLAN identifier of the target terminal, comprises:
eliminating, after each repetition, candidate terminals that were not identified in previous repetitions until one candidate terminal remains; and
determining the WLAN identifier of the target terminal as the WLAN identifier for the one remaining candidate terminal.

13. The system according to claim 11, wherein, the operation to repeat obtaining, comparing, and identifying to determine the WLAN identifier of the target terminal comprises:
eliminating, after each repetition, candidate terminals that were not identified in previous repetitions until no candidate terminal remains; and
determining that the target terminal has no matching WLAN identifier.

14. The system according to claim 11, wherein, the operation to repeat obtaining, comparing, and identifying to determine the WLAN identifier of the target terminal comprises:
computing a confidence level for each candidate terminal, wherein each confidence level for a particular candidate terminal corresponds to the number of repetitions that each the particular candidate terminal is in the vicinity of the target terminal at the same time; and
determining the WLAN identifier of the target terminal as the WLAN identifier for a candidate terminal having a confidence level above a threshold.

15. The system according to claim 14, wherein the repeating is over a predefined length of a route.

16. The system according to claim 14, wherein the repeating is during a predefined time interval.

17. The system according to claim 11, wherein the software further causes the processor to:
receive the cellular identifier for the target terminal from a monitoring center; and
communicate the WLAN identifier of the target terminal to the monitoring center.

18. The system according to claim 11, wherein the software further causes the processor to:
track a target individual's location or network activity using the determined WLAN identifier.

19. The system according to claim 11, wherein the cellular identifier comprises an international mobile subscriber identity (IMSI), a temporary mobile subscriber identity (TMSI), an international mobile equipment identity (IMEI), or a mobile station international subscriber directory number (MSISDN) of a mobile phone.

20. The system according to claim 11, wherein the WLAN identifier comprises a medium accesses control (MAC) address or an internet protocol (IP) address of a mobile phone.

* * * * *